United States Patent [19]
Peterson et al.

[11] 3,797,618
[45] Mar. 19, 1974

[54] CLUTCH AND BRAKE ASSEMBLY

[75] Inventors: Carl G. Peterson, Smithfield, R.I.;
Sulo A. Aijala, Attleboro, Mass.

[73] Assignee: Carl G. Peterson Co., Smithfield, R.I.

[22] Filed: Aug. 25, 1972

[21] Appl. No.: 283,921

[52] U.S. Cl............. 192/12 BA, 192/33 C, 192/26, 192/35, 192/84 PM, 192/77
[51] Int. Cl............................................. F16d 67/02
[58] Field of Search ........... 192/12 BA, 17 D, 33 C, 192/26, 81 R

[56] References Cited
UNITED STATES PATENTS

| | | | |
|---|---|---|---|
| 2,939,329 | 6/1960 | Doerries | 192/12 BA |
| 3,008,558 | 11/1961 | Bennett et al. | 192/12 BA |
| 3,521,730 | 7/1970 | Weatherby | 192/12 BA |
| 2,901,071 | 8/1959 | Sacchini | 192/81 R X |
| 3,228,497 | 1/1966 | Shneider | 192/12 BA |
| 3,410,379 | 11/1968 | Maiershofer | 192/12 BA |

*Primary Examiner*—Benjamin W. Wyche
*Attorney, Agent, or Firm*—Salter & Michaelson

[57] ABSTRACT

A clutch and brake assembly of particular utility where a single-revolution clutching action is desired, although not limited thereto, wherein a single helical coil spring is utilized to effect both the desired clutching and braking operation. Means are provided for causing the spring to either wind or unwind. In the former situation, the spring acts as a brake by coupling the driven shaft to a fixed hub. In the latter situation, the spring acts as a clutch by coupling the driven shaft with a rotating drive wheel.

7 Claims, 7 Drawing Figures

CLUTCH AND BRAKE ASSEMBLY

BACKGROUND AND SUMMARY OF THE INVENTION

This invention is concerned generally with the type of clutch wherein a helical spring encircles a clutch surface of a rotatable member to be driven and at the same time encircles a clutch surface of rotatable drive means. One end of the spring is normally connected to the driven member, and the other end of the spring is normally associated with some form of control means that will impart a force which will cause the spring to either wind or unwind, whichever is necessary for the spring to tightly grip the aforesaid clutch surfaces, in which position the driving member clutchingly engages and drives the driven member. Operation of the control means to cause the spring to loosen its grip on the aforesaid clutch surfaces results in disengaging of the clutch means.

In assemblies of this type, it is quite common to have separate and distinct means for positively braking the driven or output shaft when the aforesaid clutch means are disengaged. In many cases, the braking means may comprise a second helical spring which becomes operative when the clutch spring is disengaged or inoperative. Examples of such an arrangement are shown generally by Baer U.S. Pat. Nos. 3,349,880; 3,425,526; and 3,465,857.

It is thought to be novel, however, to provide a clutch and brake assembly of this type wherein the same helical spring alternately performs a clutching and braking function, and hence this constitutes one of the primary features of the present invention.

Baer U.S. Pat. No. 3,373,851 shows a clutch assembly of this general type wherein only one helical spring is employed, but the spring itself performs only a clutching function, and not a braking function.

It is also an object of our invention to provide a clutch and brake assembly of the character described having novel and improved means for preventing backup of the driven shaft upon disengagement of the driving clutch and application of the braking means.

A further object is the provision of a clutch and brake assembly of the character described having novel and improved means for cushioning the stop means which effect disengagement of the clutch and engagement of the brake so as to minimize wear and breakage of those parts in the device which bear the brunt of the impact generated by said stop means.

A further object is the provision of apparatus of the character described wherein starting and stopping of the driven shaft can effectively be achieved after one complete revolution thereof, even at extremely high rotational speeds.

Another object is the provision of a device of the character described which is economically feasible to manufacture and maintain, but which nevertheless is durable and effective in use.

Other objects, features and advantages of the invention will become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figure 1:
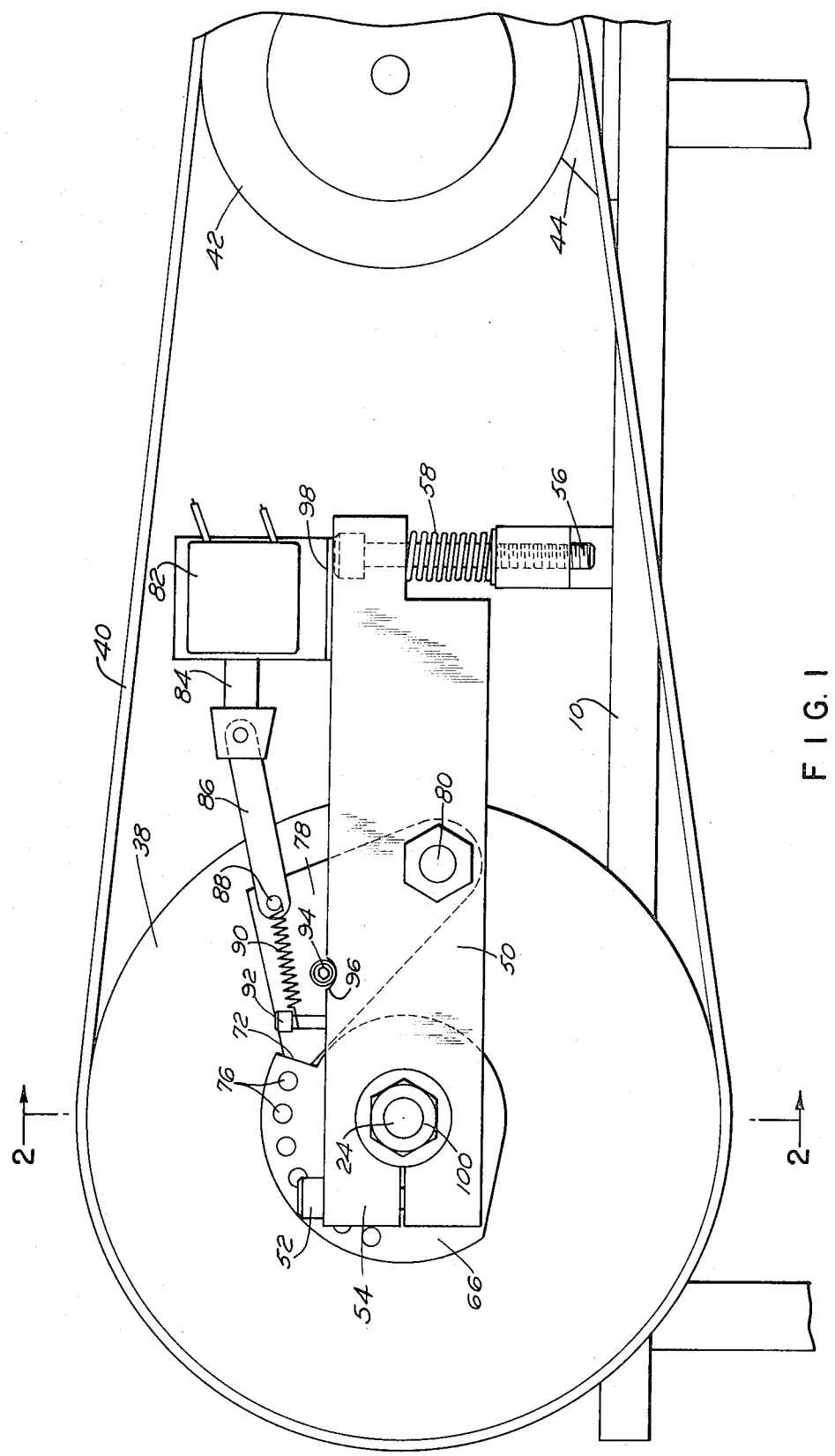
FIG. 1 is a fragmentary front elevational view of a clutch and brake assembly embodying our invention.
Figure 2:
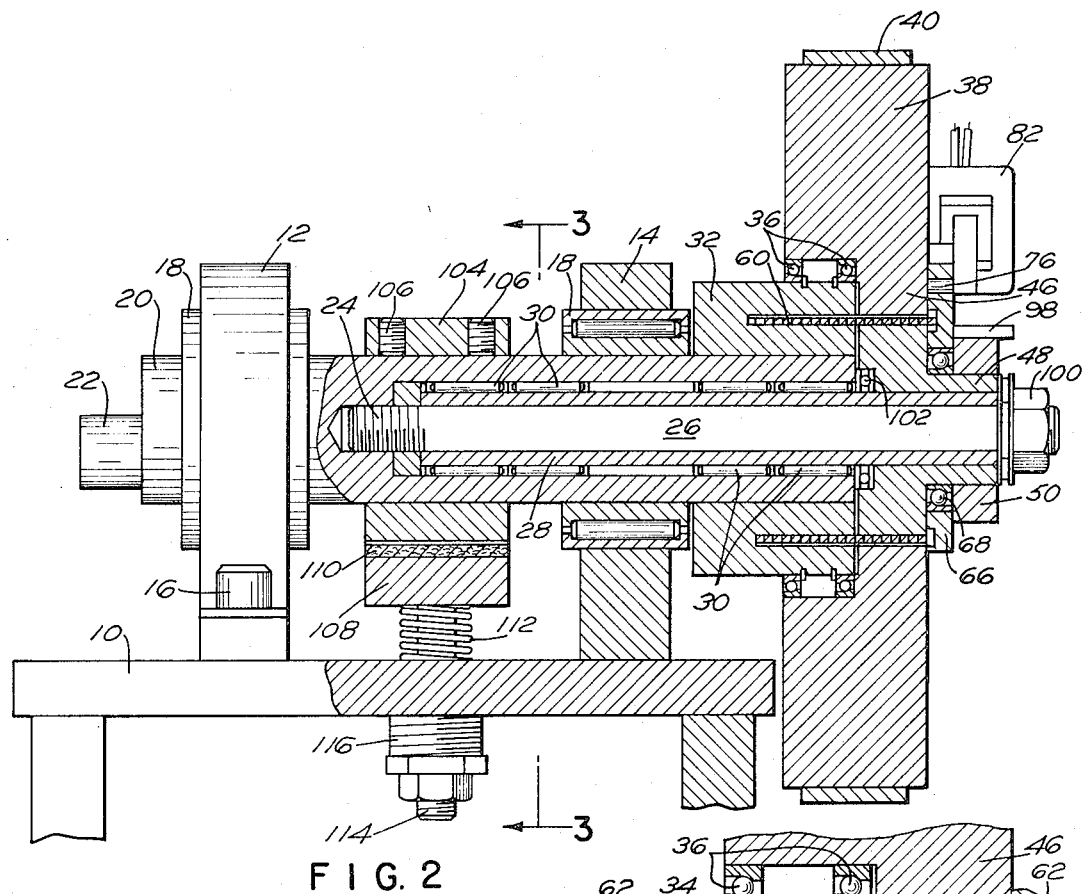
FIG. 2 is a section taken on line 2—2 of FIG. 1.

Referring now to the drawings, and more particularly FIGS. 1 and 2 thereof, a support or bench is shown at 10 having a pair of spaced, aligned, upstanding supports 12 and 14 secured thereto by any suitable means, such as fastening members 16. As will be seen, the supports 12 and 14 have bearings 18 which rotatably journal and support the driven or output shaft 20. At its outer end, as is conventional, output shaft 20 is provided with an eccentric pin 22 which is adapted to be drivingly connected to a crank, pulley, gear, sprocket or other similar member (not shown) to which the drive is to be imparted. It will be understood that a clutch and brake assembly of the type disclosed is commonly used wherever an intermittent drive is required, such as in power presses and the like.

As will be seen most clearly in FIG. 2, shaft 20 is of hollow formation for a substantial portion of its length and has secured to its hollow interior, as by the threaded attachment 24, a concentric draw bar 26 on which is mounted a hollow shaft 28 having bearings 30 therearound, whereby shaft 20 is freely rotatable relative to shaft 28. It is important to note, however, that the bearings 30 are one-way bearings, i.e., they permit rotation of shaft 20 in only one direction relative to shaft 28, for reasons hereinafter to become apparent.

Fixedly secured to shaft 20, for rotation therewith, is a drive collar 32 having an annular groove 34 extending partly therethrough. Rotatably mounted on the outer surface of drive collar 32, as by bearings 36, is a drive wheel 38 of relatively heavy steel construction, which wheel simultaneously functions as a flywheel and a pulley. More specifically, as will be seen most clearly in FIG. 1, a belt 40 is in engagement with the outer surface of wheel 38 and extends around wheel 42 of motor 44, whereby the wheel 38 is continuously driven when motor 4 is energized. As will be seen most clearly in FIGS. 2 and 4, the wheel 38 has an inwardly extending portion 46 which terminates in spaced relation to a hub member 48 which is fixedly mounted on internal shaft 28. It is important to note that the portion 46 of wheel 38 and hub 48 are in spaced relation to each other, said spacing defining an annular groove that is in communication and registry with the aforesaid groove 34, and hence constitutes a continuation thereof. As will be seen most clearly in FIG. 1, a radially extending arm 50 clampingly engages the end portion of hub member 48 to fixedly maintain the latter against rotation, and hence at the same time shaft 28 is maintained against rotation, since hub 48 is fixedly secured thereon. Screw means 52 are provided for securely gripping the bifurcated end 54 of arm 50 around hub 48, and at its opposite end the arm 50 is resiliently mounted on support means 10 by means of threaded stud 56 and spring 58. It will therefore be apparent that spring 58 functions as cushioning means to help absorb the impact occasioned by sudden stopping of shaft 20, as will hereinafter become more clear.

Figure 5:
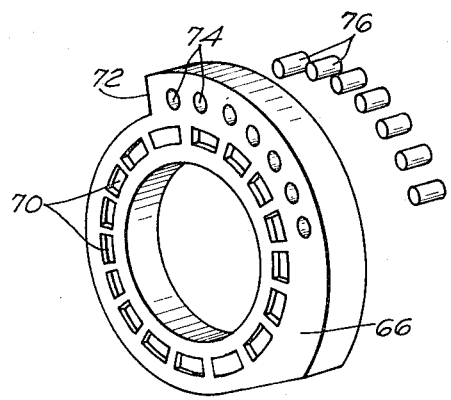
FIG. 5 is a perspective detail of the control cam per se.
Figure 6:
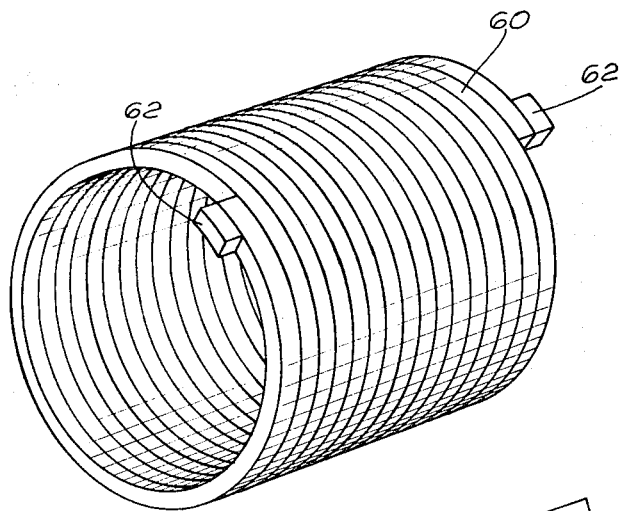
FIG. 6 is a perspective detail of the spring per se.

Positioned within the annular groove 34 is a helical spring 60 having lugs 62 at opposite ends thereof. Since during operation of the clutch and brake assembly the lugs 62 are called upon to absorb considerable impact and stress, it has been found that merely bending the ends of the spring outwardly so as to provide tangs is not satisfactory. Bending the ends of the spring is a conventional technique for providing lugs, as exemplified, for example, by the aforesaid Baer U.S. Pat. No. 3,349,880, see FIG. 9. As stated, however, it has been found that bending the ends of the spring does not provide lugs of sufficient strength, and hence we provide our lugs 62 by welding or brazing an elongated piece of spring wire to the ends of the spring in side-by-side relation, as illustrated clearly in FIG. 6. It has been found that lugs so constructed have the necessary strength to absorb the impact and stress that the spring ends normally encounter, without undue breakage taking place. It will be understood that the end of the spring 60 is connected to drive collar 32 by means of lug 62 being positioned in a suitable recess 64 therein. The spring 60 extends completely through annular groove 34, and its other end 62 is connected to control cam 66, see FIG. 5. As will be seen most clearly in FIG. 2, control cam 66 is rotatably mounted, as by bearings 68, on hub 48, in close adjacency to drive wheel 38. The inner surface of control cam 66 is provided with a series of recesses 70, any one of which may receive the adjacent end lug 62 of spring 60 in order to interconnect that end of the spring with the control cam. By providing a series of recesses 70, the interconnection between spring and control cam 66 may be adjustably located at any desired position. As will be noted, control cam 66 is provided with a shoulder 72; and adjacent thereto, along the periphery of the control cam, are a plurality of openings 74, each of which is adapted to loosely receive therein pin members 76, which are permanent magnets. The purpose of the magnets 76 is to provide a releasable magnetic coupling between control cam 66 and drive wheel 38, whereby the former will rotate with the latter unless otherwise prevented from doing so.

Figure 7:
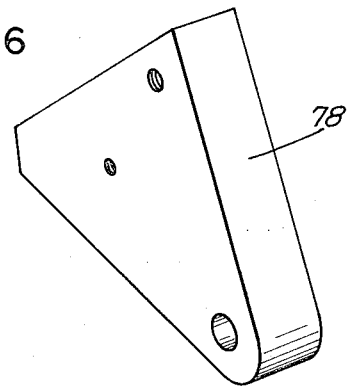
FIG. 7 is a perspective detail of the latch per se.

A latch member 78 (FIG. 7) is pivotally mounted to arm 50, as at 80, and is normally resiliently urged into locking or stop engagement with shoulder 72, as illustrated in FIG. 1. More specifically, the latch member 78 is adapted to be retracted by solenoid 82 when the latter is energized by any suitable means (not shown), whereupon retraction of solenoid plunger 84 retracts link 86 pivotally connected to latch 78 as at 88. Spring 90 is connected to link 86 at one end and at its other end is connected to pin 92 carried by arm 50, whereby the spring 90 functions as means for normally biasing latch 78 to its operative or stop position, as illustrated in FIG. 1. Latch 78 is also provided with screw means 94 which engages arcuate depression 96 in the upper edge of arm 50 to limit the forward movement of latch 78 pursuant to the biasing action of spring 90. Solenoid 82 is mounted on any suitable support, such as bracket 98, secured to arm 50.

The outer end of draw bar 24 threadedly receives nut 100, which, when tightened, urges hub 48 toward the end of drive collar 32 to maintain the parts in properly assembled relation. End thrust bearings 102 are provided for rotatably receiving the end of shaft 20.

Figure 4:
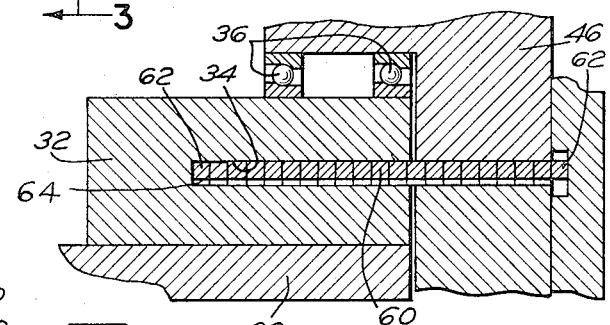
FIG. 4 is an enlarged fragmentary view showing the spring in its clutching or drive position.

It is important to note that the depth of groove 34 is greater than the thickness of spring 60, as illustrated most clearly in FIG. 4. Specifically, it has been found that the groove should be approximately 0.015 inch deeper than the thickness of the spring.

In operation, and with motor 44 driving wheel 38, and with the parts in the position illustrated in FIG. 1, it will be obvious that latch 78 prevents control cam 66 from rotating, although wheel 38 is free to rotate on bearings 36 on drive collar 32. At this time, the spring 60 is tightly wound and is securely gripping hub 48 and drive collar 32. Since, however, hub 48 is restrained against rotation by means of clamping arm 50, drive collar 32 will likewise be restrained, and hence shaft 20 will be braked. Upon energization of solenoid 82, latch 78 retracts, and the magnetic coupling between control arm 66 and drive wheel 38 causes the former to commence to rotate. This movement of control cam 66 starts to uncoil spring 60 so as to expand the latter, whereby its grip on hub 48 is released, and wheel 38 is now clutched or gripped. The spring 60 remains in gripping engagement with drive collar 32, although it shifts its grip from the bottom surface of groove 34 to the top surface thereof. In any event, since the spring 60 is now drivingly coupling the rotating wheel 38 with drive collar 32, shaft 20, which is fixed to drive collar 32, correspondingly rotates about bearings 30. This rotation will continue until latch 78 again moves in position to engage shoulder 72, which may be after one revolution or any desired number of revolutions, depending upon the timing circuit for energizing and deenergizing the solenoid. When latch member 78 again engages shoulder 72, rotation of control cam 66 is abruptly halted, causing spring 60 to commence to wind, whereupon the gripping action between spring 60 and wheel 38 is released, and the spring 60 again grips fixed hub 48 to effect braking of the system. The aforesaid resilient mounting of arm 50 permits some degree of cushioning to exist when latch 78 engages shoulder 72, thereby lessening the impact which takes place and minizing breakage of these parts. By the same token, this cushioning action lessens the impact on the spring ends 62, although, as aforesaid, it has been found that the specific structure of lugs 62 results in longer life and less breakage.

Figure 3:
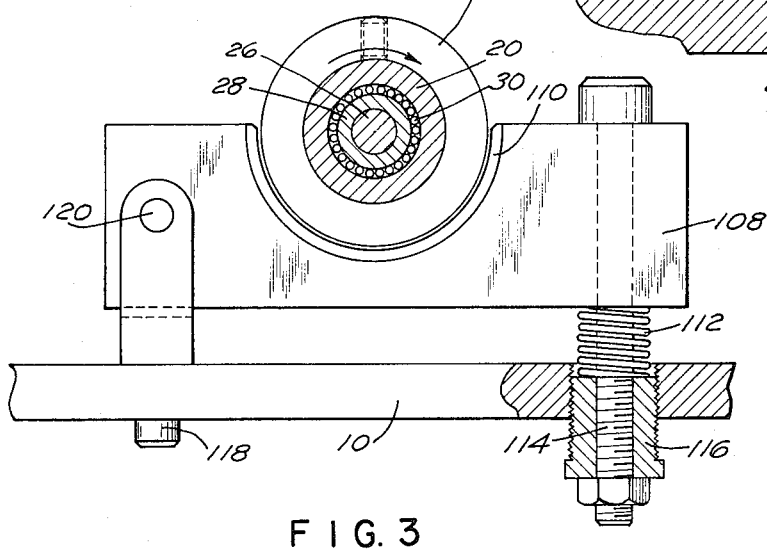
FIG. 3 is a section taken on line 3—3 of FIG. 2, with a portion broken away for purposes of illustration.

When latch 78 engages stop 72 to effect braking of the system, there is, of course, a tendency for the sudden stopping of shaft 20 to promote backup thereof. This tendency is partially prevented by the utilization of the one-way bearings 30, and this tendency is further minimized by the provision of a constant drag brake 104 which encircles shaft 20 and is secured thereto by any suitable fastening means, such as screws 106. As will be seen most clearly in FIGS. 2 and 3, a brake shoe 108 having a brake lining 110 is resiliently urged into frictional engagement with brake 104 by means of spring 112 associated with mounting pin 114. An adjusting nut 116 is provided to permit adjustment of the spring pressure exerted by spring 112, whereby the frictional drag on brake 104 against shaft 20 may be likewise adjusted. As will be seen, brake shoe 108 is mounted on support 10, at one of its ends by the aforesaid pin 114 and at its other end by pin 118, pivotally connected to the shoe, as at 120. As aforestated, the constant frictional drag on shaft 20 imparted by this brake assembly further minimizes the likelihood of any backup of shaft 20 pursuant to sudden stoppage of the latter.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A clutch and brake assembly comprising a rotatable output shaft, a drive collar fixedly mounted on said shaft, drive means for imparting rotation to said shaft comprising a rotatably mounted drive wheel, a fixed hub concentrically positioned within said wheel in spaced relation thereto so as to define an annular groove therebetween, an annular passage in said drive collar in communication and registry with said groove, a helical coil spring positioned in said passage and groove and having one end connected to said collar and having its other end extending outwardly beyond said groove, the depth of said passage and groove being slightly greater than the thickness of said spring, whereby when a winding force is imparted to said spring, it contracts and tightly grips said hub and said drive collar so as to brake said shaft, whereas when an unwinding force is imparted to said spring, it expands and grips said drive wheel and said drive collar, whereby said wheel imparts rotation to said shaft, and means operatively associated with said other end portion of said spring for imparting a winding and unwinding force thereto, said means comprising a rotatably mounted cam to which said other spring end portion is connected, magnetic means releasably coupling said cam to said drive wheel for rotation therewith to impart an unwinding force to said spring, and means operable to stop rotation of said cam whereby a winding force is imparted to said spring.

2. In the assembly of claim 1, said releasable coupling means comprising a plurality of openings extending through said cam, and a magnetic pin loosely mounted in each said opening whereby said cam is magnetically attracted to said drive wheel for rotation therewith.

3. In the assembly of claim 1, said stop means comprising a solenoid controlled latch.

4. In the assembly of claim 1, frictional drag brake means in constant engagement with said output shaft.

5. In the assembly of claim 1, said output shaft being rotatably mounted on one-way bearings in order to prevent back-up thereof upon sudden braking.

6. A clutch and brake assembly comprising a rotatable output shaft, a drive collar fixedly mounted on said shaft, drive means for imparting rotation to said shaft comprising a rotatably mounted drive wheel, a fixed hub concentrically positioned within said wheel in spaced relation thereto so as to define an annular groove therebetween, an annular passage in said drive collar in communication and registry with said groove, helical coil spring positioned in said passage and groove and having one end connected to said collar and having its other end extending outwardly beyond said groove, the depth of said passage and groove being slightly greater than the thickness of said spring, whereby when a winding force is imparted to said spring, it contracts and tightly grips said hub and said drive collar so as to brake said shaft, whereas when an unwinding force is imparted to said spring, it expands and grips said drive wheel and said drive collar, whereby said wheel imparts rotation to said shaft, and means operatively associated with said other end portion of said spring for imparting a winding and unwinding force thereto, said means comprising a rotatably mounted cam to which said other spring end portion is connected, means releasably coupling said cam to said drive wheel for rotation therewith to impart an unwinding force to said spring, and means operable to stop rotation of said cam whereby a winding force is imparted to said spring, said cam having a plurality of recesses therein, said other spring end portion extending into any one of said recesses to effect the said connection with said cam.

7. A clutch and brake assembly comprising a rotatable output shaft, a drive collar fixedly mounted on said shaft, drive means for imparting rotation to said shaft comprising a rotatably mounted drive wheel, a fixed hub concentrically positioned within said wheel in spaced relation thereto so as to define an annular groove therebetween, an annular passage in said drive collar in communication and registry with said groove, a helical coil spring positioned in said passage and groove and having one end connected to said collar and having its other end extending outwardly beyond said groove, the depth of said passage and groove being slightly greater than the thickness of said spring, whereby when a winding force is imparted to said spring, it contracts and tightly grips said hub and said drive collar so as to brake said shaft, whereas when an unwinding force is imparted to said spring, it expands and grips said drive wheel and said drive collar, whereby said wheel imparts rotation to said shaft, and means operatively associated with said other end portion of said spring for imparting a winding and unwinding force thereto, said means comprising a rotatably mounted cam to which said other spring end portion is connected, means releasably coupling said cam to said drive wheel for rotation therewith to impart an unwinding force to said spring, and means operable to stop rotation of said cam whereby a winding force is imparted to said spring, said hub being fixed against rotation by means of a radially extending arm clamped thereto, the free end of said arm being resiliently mounted to cushion stopping of said cam.

* * * * *